Oct. 1, 1968   R. D. GARRISON   3,403,710
FENCE POST END SHARPENER
Filed March 10, 1966   4 Sheets-Sheet 1

INVENTOR
Richard D. Garrison
BY Gustave Miller
ATTORNEY

Oct. 1, 1968  R. D. GARRISON  3,403,710
FENCE POST END SHARPENER
Filed March 10, 1966  4 Sheets-Sheet 2

INVENTOR
Richard D. Garrison

BY
ATTORNEY

Oct. 1, 1968 R. D. GARRISON 3,403,710
FENCE POST END SHARPENER
Filed March 10, 1966 4 Sheets-Sheet 3
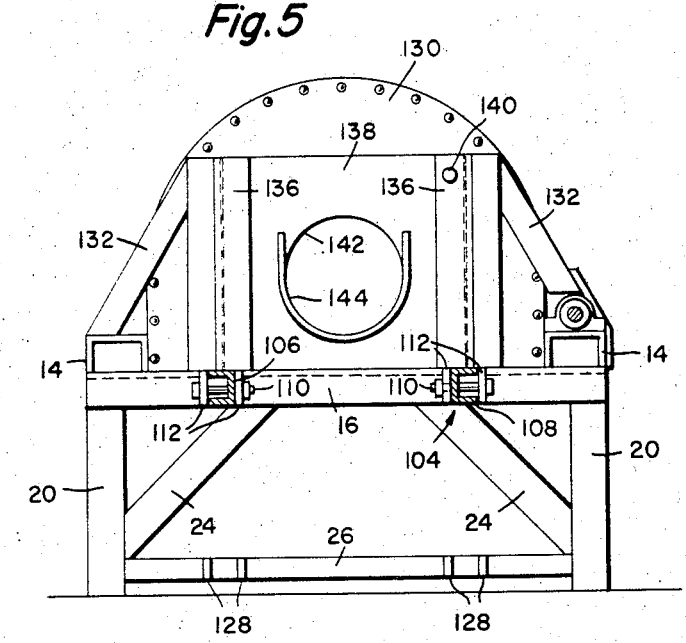
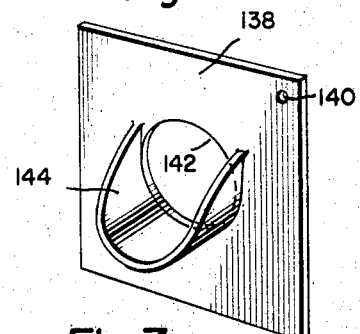
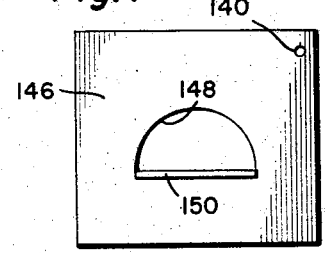
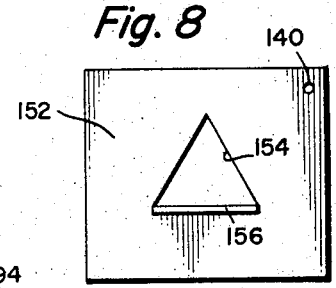
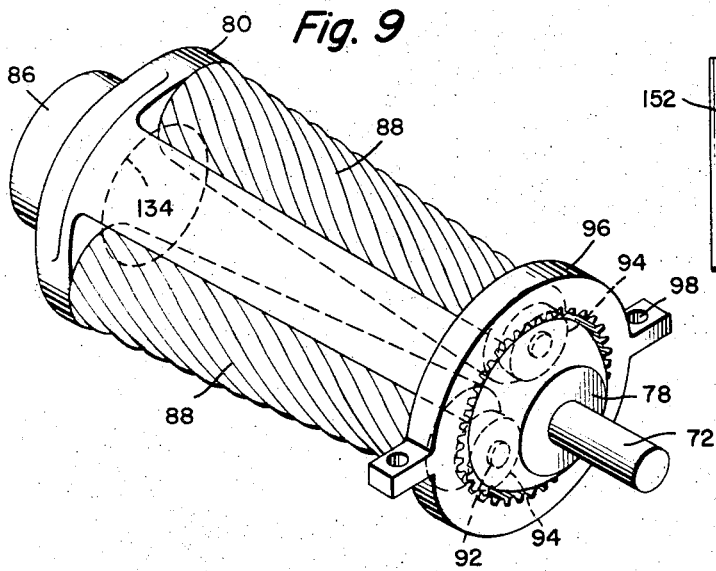
INVENTOR
Richard D. Garrison
BY
ATTORNEY

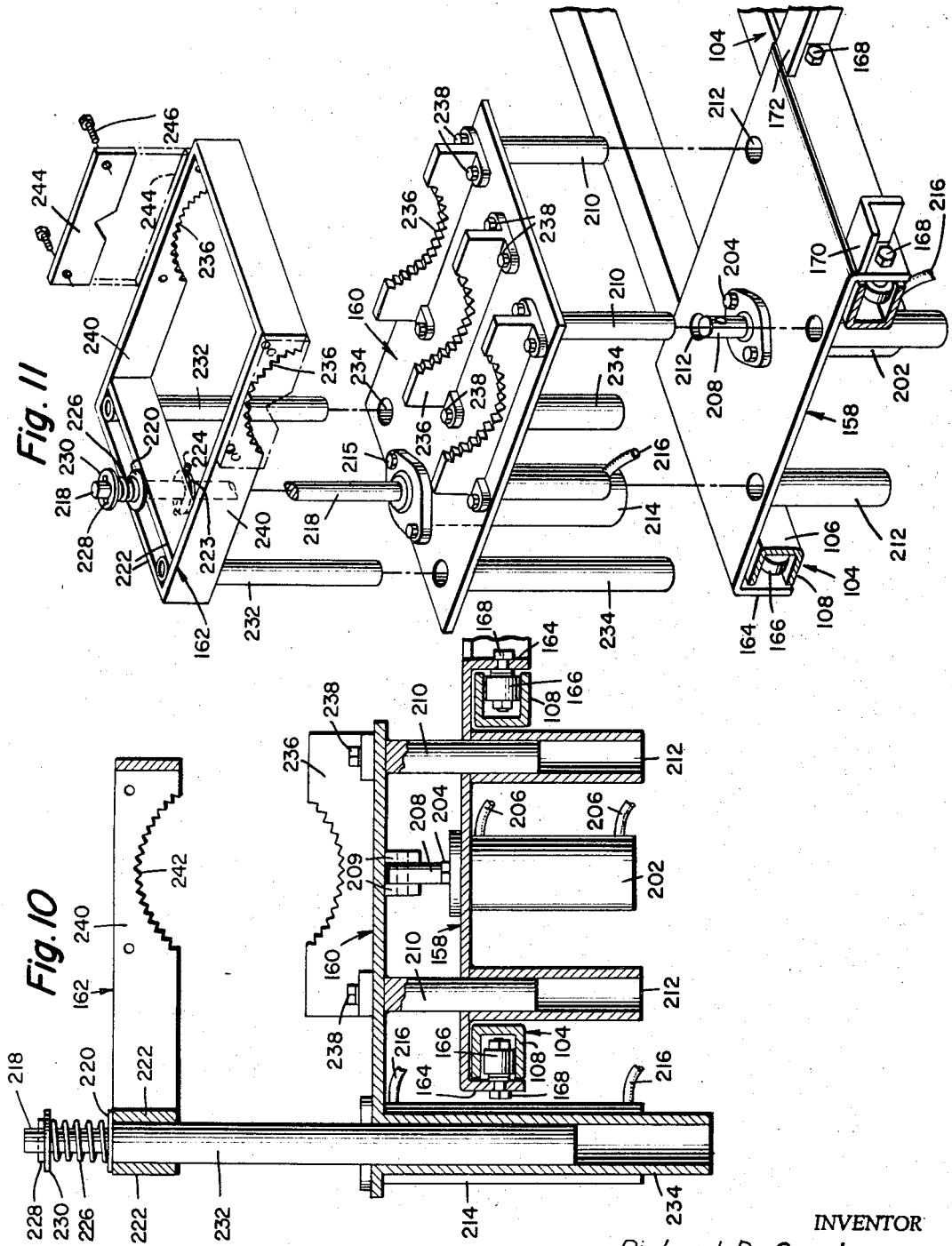

United States Patent Office 3,403,710
Patented Oct. 1, 1968

3,403,710
FENCE POST END SHARPENER
Richard D. Garrison, Rte. 1, Thayer, Mo. 65574
Filed Mar. 10, 1966, Ser. No. 533,321
11 Claims. (Cl. 144—30)

ABSTRACT OF THE DISCLOSURE

This invention is an improved fence post end sharpener which is readily brought to the location by a tractor vehicle or other vehicle such as a farm tractor, which is powered in location from the power takeoff of the tractor or vehicle, and which is provided with means for ready connection to a conventional three point hookup of the tractor or vehicle, so that it may be readily transported, without wheels of its own, and then may be set down on its own legs in operative position.

---

A object of this invention is to provide an improved sharpener means including a power takeoff power transmitting assembly for ready connection to a tractor vehicle power takeoff, and also having shear pin means in such assembly which will shear in case of jamming, thus avoiding damage to the mechanism, which shear pin is readily replaceable.

A further object of this invention is to provide hydraulic pressure producing means also powered from the power takeoff power transmitting assembly, and for using the hydraulic pressure to actuate gripping jaws to grip the fence post being sharpened, and also to use the hydraulic pressure for manipulative operation in advancing the post into rotating cutters, whereby the operator can control the rate of advance at the optimum speed, thus considerably reducing the likelihood of jamming the mechanism, and thereafter retracting it speedily for fast production.

A further object of this invention is to provide an improved fense post end sharpener having a replaceable apertured lipped post support adjacent the entrance to the cutters, the apertured lipped support being shaped and sized according to the shape and size of the post being sharpened.

In brief, this improved fence post end sharpener includes a rectangular base frame having braced legs for supporting it while in operation and a three point hookup securing means for attaching it to the conventional three point hookup hitch of a tractor or other vehicle for lifting and carrying it to and from location for operation. Rotary cutters at an angle to each other converging toward the power receiving end are actuated by being journaled in a cage, which cage is rotated, with pinion gears on each rotary cutter travelling in a circular rack causing the rotary cutters to rotate on their own axes in cutting action while at the same time the cutters are also rotated with the cage about the axis of the cage, to thus sharpen the end of a post hydraulically gripped between serrated jaws carried on a carriage hydraulically actuated to advance and retract at an optimum speed by the operator thus reducing the likelihood of jamming, with a readily replaceable shear pin included in a power takeoff power transmitting assembly to eliminate any possibility of damage should jamming actually occur. Jaw tables are hydraulically actuated into post gripping position and into position to align the post with the cutting axis. A readily changeable supporting lipped apertured plate is provided at the entrance to the cutting cage with an aperture complementary in size and shape to the post being sharpened. A supplementary notched jaw is also provided for use with the triangular shaped fence post, this shape being more popular than most other shapes.

With the above and related objects in view, this invention consists in the details of construction and combination of parts, as will be more fully understood from the following description, when read in conjunction with the accompanying drawing, in which:

FIG. 4 is a schematic plan of the hydraulic system for gripping and advancing the post being sharpened.

FIG. 5 is a section on line 5—5 of FIG. 1.

FIG. 6 is a perspective view of a changeable apertured plate and lip for a round post.

FIG. 7 shows a changeable apertured plate for a half round post.

FIG. 8 shows a changeable apertured plate for a triangular post.

FIG. 9 is a perspective view of the rotary cutters.

FIG. 10 is a section on line 10—10 showing the post holder gripper.

FIG. 11 is an exploded perspective view of the post holder gripper.

Figure 1:
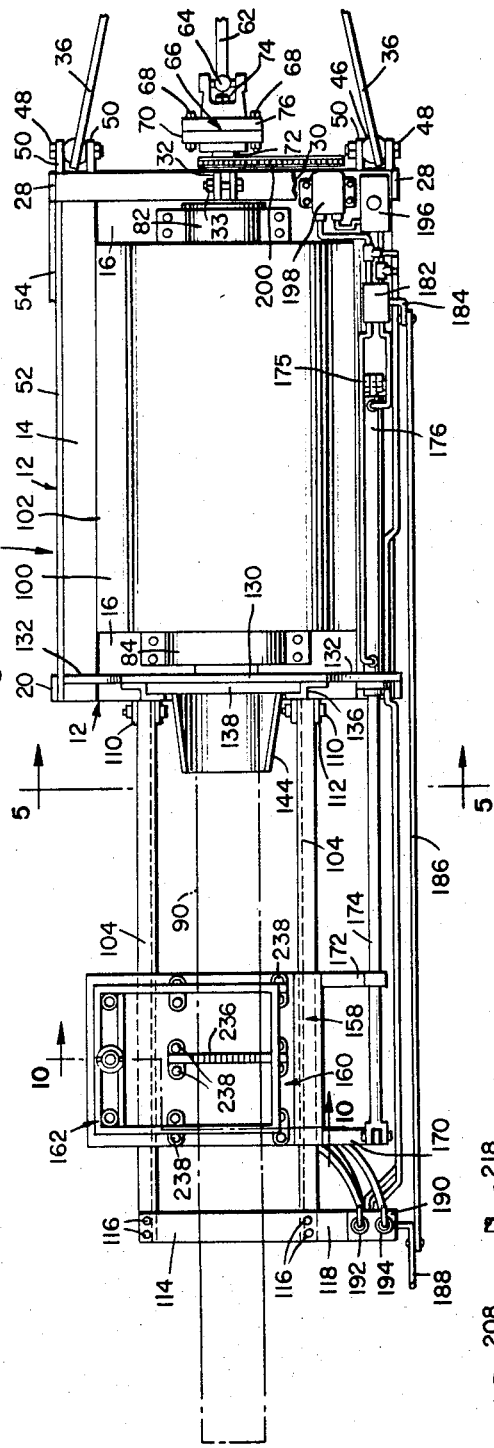
FIG. 1 is a top plan view of the complete machine, in operative position, as set up behind a farm tractor.
Figure 2:
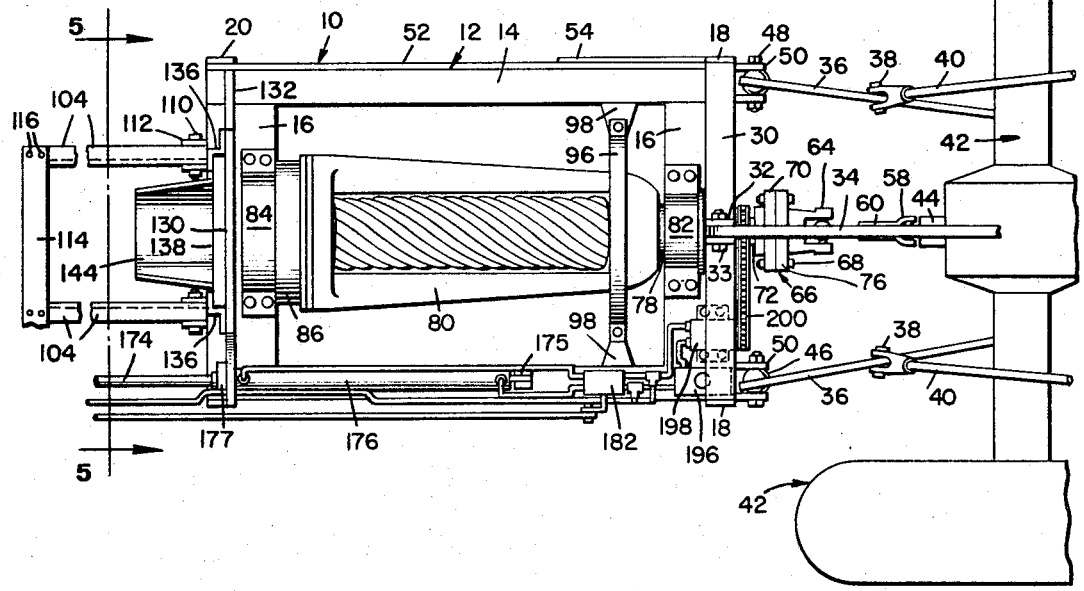
FIG. 2 is a top plan view, on a larger scale, of the sharpener itself, the cover plate, carriage and jaw.
Figure 3:
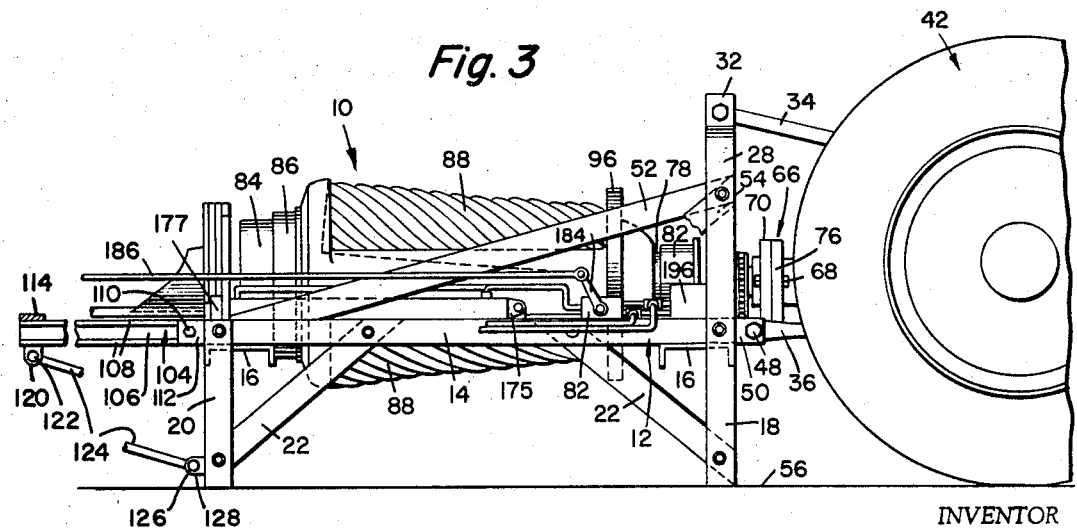
FIG. 3 is a side view of FIG. 2.

There is shown at 10 the fence post end sharpener of this invention. This sharpener 10 includes a rigid, rectangular base frame 12 consisting of a pair of longitudinally extending inverted U beams 14 secured together at their ends by transverse inverted U beams 16. The base frame 12 is supported on two depending front legs 18, and two depending rear legs 20, one at each corner, each leg 18 and 20 being reinforced by an angularly extending brace 22 and 24. A transverse lower brace 26 connects rear legs 20, and a similar transverse lower brace (not visible) also connects front legs 18.

The front legs 18 extend upward above the base frame 12 at 28 and are then connected together by a bridge 30. At its center, a pair of spaced ears 32 are apertured to receive a bolt and nut 33 for securing thereto the upper arm 34 of a conventional three point hookup hitch, which hitch also includes lower arms 36 pivoted on the tractor 42 and actuated by pivoted yokes 38 on hydraulic cylinder connecting rods 40 from the conventional hydraulic system of the vehicle, such as a farm tractor 42, the vehicle 42 also having a conventional power takeoff at 44.

The lower arms 36 are pivotally secured at 46 on a bolt and nut 48 between apertured bracket ears 50 secured to the front ends of the longitudinal beams 14. Two additional longitudinal angle braces 52 and 54 extend rearwardly from leg extensions 28 from near the tops, braces 52 extending to the top of rear legs 20, and braces 54 extending to an intermediate point on the longitudinal inverted U beams 14. With the rigid base frame 12 and the associated legs and braces thus provided, it is obvious that the weight of the entire mechanism carried thereon (hereinafter described) may be lifted and carried by the three point hookup hitch of the tractor 42, or may be set down and be supported in operative position on its legs 18 and 20 on the ground surface 56.

A universal joint 58 on tractor power takeoff 44 has a squared telescopic sleeve 60 connected thereto for slidably receiving a squared shaft 62 therein, the sleeve 62 extending from a universal joint 64 on a power takeoff power transmitting assembly 66. The assembly 66 is held together by a pair of shear pins or shear bolts and nuts 68, and consists of a rear portion 70, through which a power receiving shaft 72 is secured by a nut 74, and the front portion 76 which connects the universal joint 64 to the shear bolts 68, but is not connected to the power receiving shaft 72 except through the shear bolts 68 and rear portion 66. The power receiving shaft 72 is connected to the front end 78 of a rotary cutter rotary cage 80, this front end 78 being secured on shaft 72 journaled in a substantial front bearing 82 secured on the front transverse U beam 16, while another larger substantial centrally apertured rear bearing 84 secured on rear transverse U beam 16 journals the apertured rear end 86 of the cage 80. Journaled in the rotary cage 80 at an angle converging toward the front end 78 thereof, are a plurality of rotary cutters 88, here shown as being two in number. The rear ends of rotary cutters 88 diverge apart sufficiently to receive therebteween the end of the largest post 90 that may be inserted through the apertured rear end 86 within the apertured bearing 84 for sharpening operation. Each cutter 88 has secured on the front end 92 thereof pinion gear 94. The pinion gears 94 ride on a circular internally serrated rack 96 secured at 98 to the two longitudinal beams 14. As will be obvious, rotation of the cage 80 by shaft 72 about its axis will also cause rotation of the angularly mounted cutters 88, each about its own longitudinal axis, but at an angle to each other. A semi-cylindrical hood 100 having flanges 102 removably placed on the base frame beams 14 causes the post shavings being produced in the sharpening operation to accumulate beneath cutters 88 on the ground surface 56.

A pair of spaced apart U shaped tracks 104 having their bights 106 extending vertically and their U legs 108 extending horizontally and outwardly are rigidly secured at one end by bolts and nuts 110 through a pair of apertured ears 112 on the rear transverse beam 16. The other end of U tracks 104 has a transverse tie bar 114 secured thereto at 116 and extending beyond one of its ends at 118. Beneath the tie beam secured ends of U legs 104, depending apertured ears 120 are provided with bolts and nuts 122 for securing one end of triangle forming support rods 124. The other and lower ends of support rods 124 are secured by bolts and nuts 126 between spaced apart pairs of apertured ears 128 secured on lower rear leg brace 26 directly below upper ears 112. Thus, the U tracks 104, the support rods 124, and the transverse beam 16 and brace 26 form a rigid triangle supporting the U tracks 104.

Secured on the rear transverse beam 16, as by tack welding or otherwise, is an apertured vertically extending plate 130, braced by bars 132 extending from longitudinal beams 14 and provided with an aperture (not shown) aligned with and at least of the size of the post end receiving aperture 134 in rear cage end 86. Vertically extending tracks 136 spaced on opposite sides of the plate aperture removably hold a replaceable apertured lipped plate 138. The lipped plate 138 is provided with an aperture shaped and sized to fit the particular post 90 whose end is to be sharpened, and a pin hole 140 is provided for receiving a pin therethrough and into plate 130 for removably securing the plate 138 in its tracks 136. The removable plate 138 is shown in FIGS. 5 and 6 as having a round aperture 142 and a semi-cylindrical lip 144, for use with a round post. In FIG. 7 is shown a plate 146 and half round aperture 148 with a bottom lip 150 for a half round post, while in FIG. 8 is shown a plate 152 with a triangular aperture 154 and bottom lip 156 for a triangular shaped post, this being the most common shape for fence posts. Additional plates may also be provided for posts with larger or smaller diameters, of any shape, with their apertures likewise properly aligned with the center of cage end aperture 134.

The lip 144 holds the front end of the post 90 in axial alignment with the axis through the cage end opening 134 about which the cage 80 and its cutters 88 rotate, while rearwardly thereof, the post is also aligned and gripped and held by means of a carriage plate 158 hydraulically supporting a lower jaw table 160 which in turn hydraulically supports an upper jaw table 162, or shown in FIGS. 10 and 11, the carriage plate 158 and table 160 and 162 being manipulatively controlled by the hydraulic system 163 generally shown in FIG. 4.

The carriage plate 156 has downturned flanges 164, thus being U shaped, and rollers 166, riding on lower U legs 108 of U tracks 104 are journaled on axles 168 extending through carriage plate flanges 164. The carriage plate 158, and its supported tables 160 and 162, are manipulatively controlled by the hydraulic system 163 by means of angle iron arms 170 and 172 being suitably secured to a connecting rod 174 extending from a piston (not shown) within the hydraulic cylinder 176, supported on one of the longitudinal beams 14 and secured thereto at 175 and 177. Pressure lines 178 and 180, to opposite sides of the piston within the cylinder 176 from a pressure control valve housing 182 are controlled by valve 184.

The valve 184 is manipulatively controlled by a rod 186 pivoted to manual control handle 188 pivoted on the side of the valve housing 190 mounted on the extending end 118 of tie rod 114, the valve housing containing the vlaves 192 and 194 for hydraulically controlling the jaw tables 160 and 162 from the hydraulic system 163. Hydraulic pressure in the hydraulic system 163 is provided by a reservoir tank 196 and pump 198 supported on an adjacent end of front transverse beam 16, the pump 198 being powered by a sprocket chain 200 on takeoff power receiving shaft 72.

Hydraulic cylinder 202, secured to carriage plate 158 by studs 204 is powered by lines 206 from valve 192 for positively lifting and positively retracting a piston (not shown) therewithin on a connecting rod 208 secured to ears 209 on the bottom of lower jaw table 160. Guide rods 210 secured on the bottom of lower jaw table 160 move up or down in guide sleeves 212 depending through the bottom of lower jaw table 160.

Hydraulic cylinder 214, secured to the bottom of lower jaw table 160 by studs 215, is powered by lines 216 from valve 194 for positively lifting and positively retracting a piston (not shown) therewithin on a connecting rod 218 extending through a flanged sleeve 220 between two frame bars 222 forming part of the upper jaw table 162. A transverse pin 224 through a hole in connecting rod 218 extends under a washer 223 under the frame bars 222 for lifting the table 162. A spring 226 about connecting rod 218 on top of flanged sleeve 220, and under a washer 228 under a transverse pin 230 in the top end of connecting rod 218 provides resiliency when retracting the upper jaw table 162 against the post 90 on the lower jaw table 160 to thus positively yet resiliently grip and hold the post in operative position.

A pair of depending guide rods 232 secured between the ends of the frame bars 222 move up or down in guide sleeves 234 depending from and extending through lower jaw table 160.

A plurality of upstanding post gripping serrated arched jaws 236 (here shown as three) are secured by studs 238 in parallelism at right angles to the axis through the rotating cage 80. The two transverse frame bars 240 of upper jaw table 162 have downwardly arched serrated jaws 242 integrally formed therein, being preferably, but not necessarily, located above the two outer jaws 230 secured on the lower jaw table 160.

When the triangle apertured plate 152 is used for a triangle shaped post, an inverted V notched attachment bar 244 is secured by studs 246 across the arched serrated jaws 236 as shown, for better cooperation with the top angle edge of the post.

In operation, when needed for use in the field on location, the fence post end sharpener 10 is connected to the three point hookup hitch, arms 34 and 36 by bolts and nuts 33 through ears 34 and bolts and nuts 48 through ears 50. The conventional hydraulic system of the tractor or vehicle 40 is then operated conventionally to lift and carry the sharpener to the desired location, by means of the tractor 40, and then set on its legs 18 and 20 on the ground surface 56, and the sharpener hood 100 is left in position to deflect the wood chips downwardly. An appropriate sized and shaped lipped plate 138, 146 or 152 is put into the vertical tracks 136. If the post is triangle shaped in cross section, inverted V notched bars 244 are attached by studs 246. Valve handle 188 is manipulated to retract the carriage plate 158 on its rollers 166 to the rear end of the tracks 104. The jaw tables 160 and 162 are separated by manipulating valve handles 192 and 194, the power takeoff power transmitting assembly 66 having been connected to the tractor power takeoff 44. The post 90 is then placed in position between the separated jaw tables 160 and 162 and inserted through apertured lipped plate 138 and the apertured vertical plate 130 and through cage opening 134 to between the rotating cutters 88. The handle valves 192 and 194 are then manually manipulated to properly align the post with the axis 90 of the cage 80, raising or retracting the lower jaw table 160 and then lowering the upper jaw table 162 to grip and hold the post 90, the coil spring 226 providing resilience to the gripping action. Then, with the post 90 aligned axially and gripped, the valve handle 190 is opened to advance the carriage plate 158 toward the cage 80 and cutters 88 at an optimum speed as the rotating cutters 88 in rotating cage 80 sharpen the post end, the cuttings or shavings falling down to the ground 56, being prevented from flying upwardly by the cover 100. When the sharpening is finished, valve handle 188 is manipulated to withdraw the post 90 from the cage 80 and cutters 88 as rapidly as possible, then handle 194 is manipulated to raise upper jaw table 162 to release the post, permitting the sharpened post 90 to be removed and replaced by another post needing sharpening, and the cycle is repeated for each new post to be sharpened. After finishing, the tractor power takeoff 44 is stopped, the hydraulic system of the tractor 42 lifts up the sharpener 10 on its three point hookup hitch and the sharpener 10 is removed to another location or to storage.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A post end sharpener, means for readily detachably securing said post sharpener to a tractor vehicle having a power takeoff, for operation and transportation of said post sharpener, said post sharpener comprising a base frame, said securing means being mounted on and extending from one end of said base frame, said base frame comprising a pair of spaced apart longitudinally extending frame beams and a transverse frame beam secured at each end of said spaced apart longitudinally extending frame beams, a bearing member secured on each said transverse frame beam, a cutter cage journaled in said bearing members, a power receiving shaft extending from the front end of said cage and of said base frame, a power takeoff power transmitting assembly on said power receiving shaft for attachment to said power takeoff of said tractor vehicle, a plurality of rotary cutters journaled in said cutter cage at an angle converging toward said front end of said cage, a circular rack, concentric with said power receiving shaft, secured on said base frame adjacent said front end thereof, and a pinion gear on each said rotary cutter meshing with said rack thereby rotating said rotary cutters as said cutter cage is rotated by said power shaft, said cage having a post end receiving opening at the divergent rear ends of said rotary cutters.

2. The post end sharpener of claim 1, and a pair of spaced apart guide tracks rigidly secured to said base frame and extending longitudinally away from the rear end thereof, a carriage plate, rollers journaled on said carriage plate guided in said guide tracks, a lower and an upper post gripping jaw table, hydraulic cylinder and piston means mounted on said carriage plate and connected to said lower jaw table elevating and retracting said lower jaw table to control its distance above said carriage plate, additional hydraulic cylinder and piston means mounted on said lower jaw table and connected to said upper jaw table elevating and retracting said upper jaw table relative to said lower jaw table to thereby grip and release a post therebetween, hydraulic pressure producing means mounted on said base frame and actuated by said power takeoff, further hydraulic cylinder and piston means mounted on said base frame and connected to said carriage plate advancing and retracting said carriage plate, and individually manipulative operable means connecting said hydraulic pressure producing means to each said hydraulic cylinder and piston means for gripping a post between said jaw tables and placing the post in alignment with the axis between said rotary cutters and advancing the gripped post into said rotating cutters at a controllable speed and thereafter retracting it therefrom and thus releasing the post.

3. The post end sharpener of claim 1, and shear pin means in said power takeoff power transmitting assembly for disconnecting said assembly from said power receiving shaft in case of jamming.

4. The post end sharpener of claim 1, and a vertical plate on said base frame transversely of said post end receiving cage opening also having a post end receiving opening therethrough aligned with said post end receiving opening in said cage, vertically extending trackways on said vertical plate on opposite sides of said post end opening therethrough, and a lipped plate removably supported in said vertical trackways and having an opening shaped and sized complementary to the post end being extended therethrough to sharpening contact with said rotary cutters.

5. The post end sharpener of claim 1, and vertically depending leg means and leg brace means at each corner of said base frame member for supporting said sharpener while in operation, said post sharpener securing means comprising three point hookup hitch securing means attached to said base member at the power takeoff assembly front end thereof for attachment to a three point hookup hitch means of the tractor vehicle for lifting and supporting said sharpener while being transported.

6. The post end sharpener of claim 2, said lower jaw table having a plurality of serrated upwardly extending arched jaws thereon, said upper jaw table having a plurality of serrated downwardly extending arched jaws depending therefrom.

7. The post end sharpener of claim 6, and a notched supplementary jaw complementary to an edge of a triangular shaped post end for attachment to one of said jaws.

8. The post end sharpener of claim 2, and vertical guide means for said carriage plate and jaw tables comprising vertical depending rods on said upper and lower jaw tables extending through mating apertures in said lower jaw table and said carriage plate.

9. The post end sharpener of claim 8, and rod guide tubes aligned with said mating apertures depending from said lower jaw table and said carriage plate.

10. The post end sharpener of claim 2, said carriage plate having depending flanges extending about said guide tracks, said guide tracks being U shaped with their U bights extending vertically, and axle means on said carriage plate depending flanges extending into said U shaped guide tracks, said rollers being journaled on said axle means.

11. The post end sharpener of claim 2, said additional hydraulic cylinder and piston means including a means resiliently retracting said upper table comprising a connecting rod extending upwardly thereto, abutment means on said connecting rod abutting the bottom of said upper table, a coil spring about said connecting rod abutting the top of said upper table, and abutment means on said connecting rod abutting the top of said coil spring.

References Cited

UNITED STATES PATENTS

| | | | |
|---|---|---|---|
| 895,287 | 8/1908 | McDonald | 144—30 X |
| 1,356,031 | 10/1920 | Adams | 144—30 |
| 2,165,524 | 7/1939 | Wolf | 143—32 |
| 2,698,035 | 12/1954 | Smith | 143—32 |
| 3,073,362 | 1/1963 | Bourdon | 144—30 |
| 3,111,971 | 11/1963 | Spencer | 144—30 |

DONALD R. SCHRAN, *Primary Examiner.*